United States Patent
Sarmenta

(10) Patent No.: US 10,025,780 B2
(45) Date of Patent: Jul. 17, 2018

(54) CROWDSOURCING TRANSLATIONS

(71) Applicant: Facebook, Inc., Menlo Park, CA (US)

(72) Inventor: Luis Francisco Sarmenta, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/726,122

(22) Filed: Oct. 5, 2017

(65) Prior Publication Data

US 2018/0052833 A1    Feb. 22, 2018

Related U.S. Application Data

(63) Continuation of application No. 15/612,060, filed on Jun. 2, 2017, now Pat. No. 9,817,819, which is a continuation of application No. 15/238,466, filed on Aug. 16, 2016, now Pat. No. 9,703,775.

(51) Int. Cl.
*G10L 21/00* (2013.01)
*G06F 17/28* (2006.01)
*H04L 29/08* (2006.01)
*G10L 25/00* (2013.01)

(52) U.S. Cl.
CPC .......... *G06F 17/2854* (2013.01); *H04L 67/22* (2013.01)

(58) Field of Classification Search
CPC ... H04L 67/22; G06F 17/289; G06F 17/2854; G06F 17/28; G06F 17/2872; G06F 17/30669
USPC ........................................ 704/2, 5, 7, 10, 277
See application file for complete search history.

(56) References Cited

U.S. PATENT DOCUMENTS 9,703,775 B1 * 7/2017 Sarmenta ............ G06F 17/2836
9,817,819 B1 * 11/2017 Sarmenta ................ H04L 67/22

* cited by examiner

*Primary Examiner* — Thierry L Pham
(74) *Attorney, Agent, or Firm* — Baker Botts L.L.P.

(57) ABSTRACT

In one embodiment, a method includes accessing, by one or more of the computing devices, one or more translations for each text string of a plurality of text strings; determining, by one or more of the computing devices, a priority value for each text string of the plurality of text strings, wherein the priority value for the text string is based on one or more reliability-values of the one or more translations for the text string; selecting, by one or more of the computing devices, a particular text string from the plurality of text strings based on its priority value; and sending, to a client system, instructions configured to present a translation prompt comprising the particular text string.

33 Claims, 8 Drawing Sheets

700

710 — selecting a first text string from a set of text strings to be translated, wherein each text string of the set of text strings is associated with a priority value, and wherein the first text string is selected based on its priority value, wherein the priority value of the first text string is determined based on one or more previously calculated reliability-values of one or more translations for the first text string 720 — sending, to a client system of a first user, instructions configured to present a translation prompt comprising the first text string and a translation-input field, wherein the first user is associated with a credibility-score based on prior translation activity of the first user 730 — receiving, from the client system, an input by the first user at the translation-input field, wherein the input corresponds to a first translation for the first text string 740 — calculating a reliability-value for the first translation based on the input and the credibility-score of the first user

*FIG. 7*

CROWDSOURCING TRANSLATIONS

PRIORITY

This application is a continuation under 35 U.S.C. § 120 of U.S. patent application Ser. No. 15/612,060, filed 2 Jun. 2017, which is a continuation under 35 U.S.C. § 120 of U.S. patent application Ser. No. 15/238,466, filed 16 Aug. 2016, now U.S. Pat. No. 9,703,775, issued 11 Jul. 2017.

TECHNICAL FIELD

This disclosure generally relates to online social networks and facilitating language translations within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may select a first text string from a set of text strings to be translated. Each of the text strings of the set may be associated with a priority value. The first text string may be selected based on its associated priority value. The priority value of the first text string may be determined based on one or more previously calculated reliability-values of one or more translations for the first text string. For example, the priority value may be based on one or more previously calculated reliability-values of one or more best translations for the first text string (e.g., translations that have reliability-values that are greater than those of any other translation for the first text string). The social-networking system may send, to a client system of a first user, instructions configured to present a translation prompt. The translation prompt may prompt the first user to contribute toward translating the first text string. The translation prompt may include the first text string and a translation-input field that may be configured to accept an input from the first user directed toward translating the first text string. The first user may be associated with a credibility-score that may serve as a measure of the first user's credibility in translating text strings such as the first text string. The credibility-score may be based on any combination of several factors associated with the first user. The credibility-score may be based on prior translation activity of the first user. The social-networking system may receive, from the client system, an input by the first user at the translation-input field. The input may correspond to a first translation for the first text string, and may represent a possible contribution by the first user toward a consensus translation for the first text string. The social-networking system may calculate a reliability-value for the first translation that reflects how likely it is that the first translation is a reliable translation of the first text string. The reliability-value may be based on one or more factors, including the input itself and the credibility-score of the first user.

The described methods may be used to crowdsource reliable translations from users for text strings among any languages known by a collective pool of users. One problem with crowdsourcing translations is that translators (especially crowdsourced translators) are not always reliable. As an example and not by way of limitation, malicious users may submit bad translations on purpose, well-meaning users may submit incorrect translations (e.g., as a result of misunderstanding words, making typos), and other users simply may not understand what they are doing (e.g., a user may not understand the function of a translation prompt and may submit erroneous inputs). Relatedly, even translations that are correct may sometimes not be optimal translations, since there is often more than one correct translation for a text string. In all these cases, the social-networking system needs to be able to determine which translation is most reliable or most optimal. The methods described herein contemplate evaluating the reliability of received translation submissions (e.g., a new translation, a vote for an existing translation) based on the credibility of the individual users who sent the translation submissions and further contemplates prioritizing certain text strings to send to users for translation. The credibility of the individual users may be determined by, for example, periodically spot-checking their translations over time against translations known to be correct (i.e., control questions). The credibility of users may also be based on other factors such as user demographics. Another problem intended to be solved is the limited number of users and limited time available for crowdsourcing the translations. The social-networking system may prioritize the text strings that are sent to users for translation. This prioritization may be based on, for example, the relative importance (or "impact") of the text strings and on the reliability of their current best translations (e.g., prioritizing the translation of text strings having current best translations with relatively low reliability-values), among other factors. A best translation may be a translation that has a reliability-value that is greater than those of any other translation for the first text string. There may be multiple such translations (e.g., in the case where multiple translations have equal reliability-values that are the highest in the set of translations for the first text string). Although this disclosure focuses on translating user interface elements of the online social network, it contemplates using the same methods described herein on other content (e.g., text in posts, comments, and messages;

text in an article). Likewise, although this disclosure focused on text strings, it contemplates using the same methods described herein for other media (e.g., audio, images, emojis, video).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example method 700 for crowdsourcing translations on an online social network.

DESCRIPTION OF EXAMPLE EMBODIMENTS

System Overview

Figure 1:
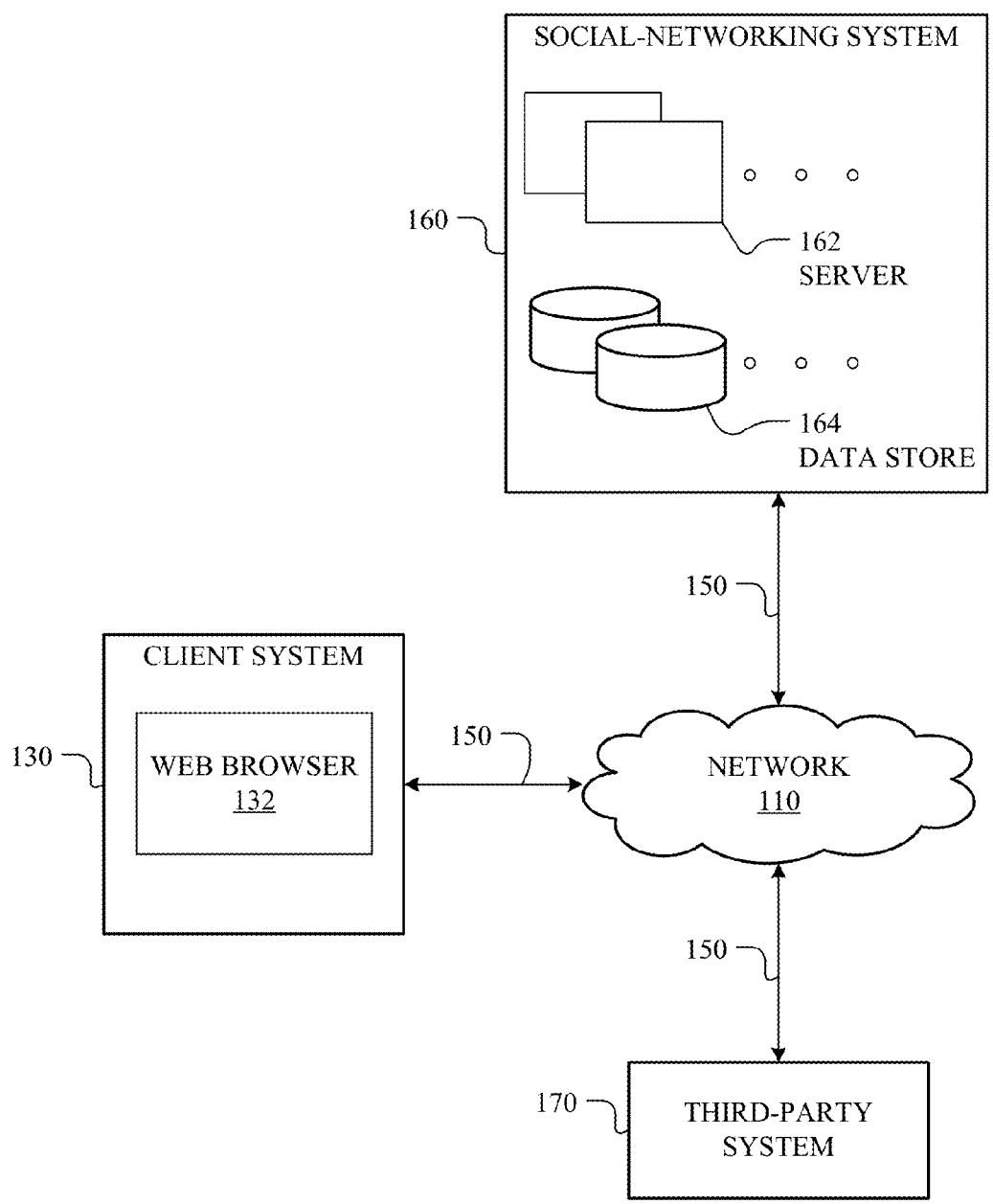
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
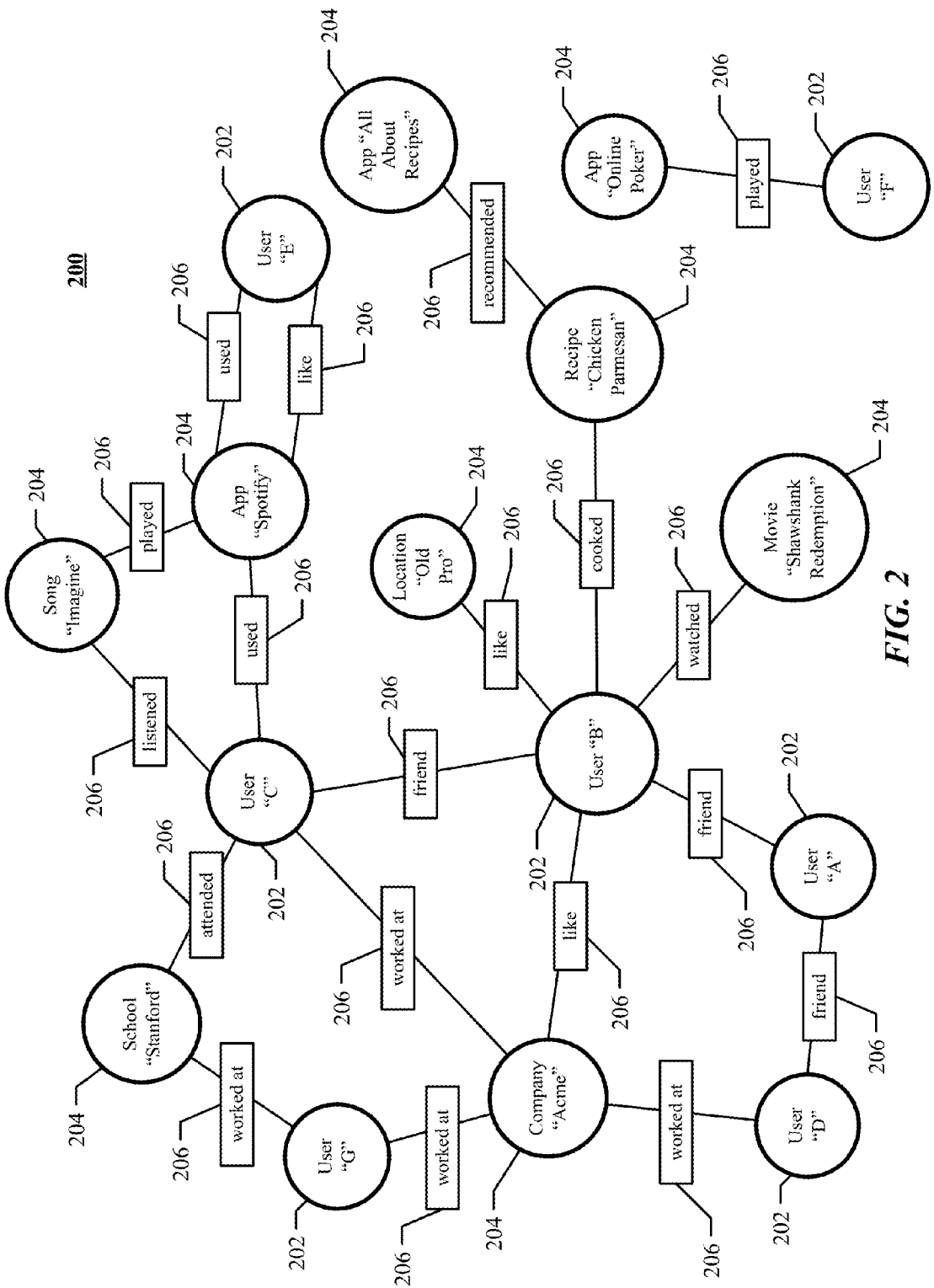
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Crowdsourcing Translations

In particular embodiments, the social-networking system 160 may select a first text string from a set of text strings to be translated. Each of the text strings of the set may be associated with a priority value. The first text string may be selected based on its associated priority value. The priority value of the first text string may be determined based on one or more previously calculated reliability-values of one or more translations for the first text string. For example, the priority value may be based on one or more previously calculated reliability-values of one or more best translations for the first text string (e.g., translations that have reliability-values that are greater than those of any other translation for the first text string). The social-networking system 160 may send, to a client system of a first user, instructions configured to present a translation prompt. The translation prompt may prompt the first user to contribute toward translating the first text string. The translation prompt may include the first text string and a translation-input field that may be configured to accept an input from the first user directed toward translating the first text string. The first user may be associated with a credibility-score that may serve as a measure of the first user's credibility in translating text strings such as the first text string. The credibility-score may be based on any combination of several factors associated with the first user. The credibility-score may be based on prior translation activity of the first user. The social-networking system 160 may receive, from the client system, an input by the first user at the translation-input field. The input may correspond to a first translation for the first text string, and may represent a possible contribution by the first user toward a consensus translation for the first text string. The social-networking system 160 may calculate a reliability-value for the first translation that reflects how likely it is that the first translation is a reliable translation of the first text string. The reliability-value may be based on one or more factors, including the input itself and the credibility-score of the first user.

The described methods may be used to crowdsource reliable translations from users for text strings among any languages known by a collective pool of users. One problem with crowdsourcing translations is that translators (especially crowdsourced translators) are not always reliable. As an example and not by way of limitation, malicious users may submit bad translations on purpose, well-meaning users may submit incorrect translations (e.g., as a result of misunderstanding words, making typos), and other users simply may not understand what they are doing (e.g., a user may not understand the function of a translation prompt and may submit erroneous inputs). Relatedly, even translations that are correct may sometimes not be optimal translations, since there is often more than one correct translation for a text string. In all these cases, the social-networking system 160 needs to be able to determine which translation is most reliable or most optimal. The methods described herein contemplates evaluating the reliability of received translation submissions (e.g., a new translation, a vote for an existing translation) based on the credibility of the individual users who sent the translation submissions and further contemplates prioritizing certain text strings to send to users for translation. The credibility of the individual users may be determined by, for example, periodically spot-checking their translations over time against translations known to be correct (i.e., control questions). The credibility of users may also be based on other factors such as user demographics. Another problem intended to be solved is the limited number of users and limited time available for crowdsourcing the translations. The social-networking system 160 may prioritize the text strings that are sent to users for translation. This prioritization may be based on, for example, the relative importance (or "impact") of the text strings and on the reliability of their current one or more best translations (e.g., prioritizing the translation of text strings having current best translations with relatively low reliability-values), among other factors. A best translation may be a translation that has a reliability-value that is greater than those of any other translation for the first text string. There may be multiple such translations (e.g., in the case where multiple translations have equal reliability-values that are the highest in the set of translations for the first text string). Although this disclosure focuses on translating user interface elements of the online social network, it contemplates using the same methods described herein on other content (e.g., text in posts, comments, and messages; text in an article). Likewise, although this disclosure focused on text strings, it contemplates using the same methods described herein for other media (e.g., audio, images, video).

In particular embodiments, the social-networking system 160 may select a first text string from a set of text strings to be translated. The text strings may be, for example, text strings that are part of a user interface of the social-networking system 160 (e.g., descriptions of elements on a page of the online social network). Alternatively, they may be strings that are part of any suitable content such as articles and user communications (adhering to privacy constraints). Each of the text strings of the set may be associated with one or more priority values. In particular embodiments, for a particular text string, the social-networking system 160 may calculate separate priority values for each different language. As an example and not by way of limitation, a text string may have a different priority value in Spanish than it does in Russian. In particular embodiments, the first text string may be selected based on its priority value. As an example and not by way of limitation, the social-networking system 160 may bias its selection of text strings toward text strings having a high priority value. In this example, it may be more likely that a text string with a relatively high priority value will be selected more frequently than a similar text string with a lower priority value. In particular embodiments, the priority value may be the output of a prioritization algorithm that favors the translation of text strings that are of high impact to users. The prioritization algorithm may also favor text strings for which the current one or more best translations are relatively not reliable. The goal of the prioritization algorithm in assigning priority values may be to ensure that such text strings are the focus of the available users. The following equation may illustrate, at a high level, the relationship of the factors mentioned above (i.e., the impact to users and the reliability-value of the best translations) with the priority value of a particular text string: priority value=impact-metric×(1−reliability-value of best translations), where the impact-metric is a measure of the impact of the text string to users, and where the reliability-value is a measure of the reliability of a translation. This equation specifies that the priority value of a text string increases with higher impact and lower reliability. In particular embodiments, the priority value of a particular text string may also be based on reliability-values of other translations of the particular text string that are not the best translations of the particular text string (i.e., non-best translations, which do not have the highest reliability-value among the translations of the particular text string). As an example and not by way of limitation, a text string S1 may have three translations with reliability-values of 30%, 20%, and 20%, while a text string S2 may have three translations with reliability-values of 30%, 10%, and 10%. In this example, even though the best translations of both text strings have equal reliability-values (e.g., 30%), the text string S2 may receive a higher priority value because its non-best translations have lower reliability-values than the non-best translations of the text string S1 (e.g., the text string S2 has two non-best translations with reliability-values of 10%, compared to the two non-best translations of the text string S1 with reliability-values of 20%). In particular embodiments, the priority value may not be based on any reliability-values, particularly in the case where no reliability-values have been calculated for any translation for the particular text string. In such a case, the priority value may be based purely on the impact-metric and/or additional suitable factors. Although this disclosure describes selecting for translation a particular text string in a particular manner, it contemplates selecting any suitable unit of translation for translation in any suitable manner.

The impact-metric may be based on the user-reach of a text string. The user-reach of a text-string may be based on an estimate of the number of distinct users for whom a translation of the first text string is to be published (e.g., presented as a translation for the first text string on a user interface that was requested to be translated). This estimate may be based on a sample of a plurality of text strings or their associated translations that have been published to all users or a sample subset of users. As an example and not by way of limitation, the social-networking system 160 may determine that twenty thousand distinct users have accessed a Help Page and one billion distinct users have accessed the Home Page. In this example, a text string on the Home Page may have a greater user-reach than a text string on the Help Page. The estimate of the number of distinct users may also be based on the number of distinct viewers to whom the first text string or a translation thereof has so far been published. The impact-metric may also be based on an estimate of the occurrence-frequency, which may be based on an estimate of the frequency that the first text string or translation thereof is expected to be published to an individual user. As an example and not by way of limitation, on a Home Page, the text string "status" may only be displayed once, while the text string "like" may be displayed numerous times. In this example, even though the same number of distinct users may see both strings, the text string "like" may have a greater impact-metric than the text string "status." In particular embodiments, the following equation may illustrate, at a high level, the relationship of the factors mentioned above (i.e., the user-reach and the occurrence-frequency) with the impact-metric: impact-metric=user-reach×log(1+occurrence-frequency). The logarithmic function in the equation may act to soften the impact of the occurrence-frequency, which may be advantageous because some text strings, by their very nature, are published multiple times on a page/interface, but are not necessarily more important than a text string that is published only once on the same page/interface. As an example and not by way of limitation, the text string for a Home button on a Home Page of an online social network may only be published once, but the text string for a Like button may be published numerous times on the same page (e.g., for each post or comment that appears on the page). In this example, the text string "like" may not necessarily be more important than the text string "home," even though the former is published more frequently.

In particular embodiments, the data used to determine the user-reach and occurrence-frequency estimates may be retrieved from a data log that may store text strings that are published as users access pages/interfaces of the online social network and also the number of times the text strings are published. As an example and not by way of limitation, every time a user accesses the Home Page of the online social network, the data log may store the text strings that are published on that page or update the count for the number of times the respective text strings were entered. In creating or updating the data log, the social-networking system 160 may either log every single publication of a text string or may merely log samples of publications (e.g., at a 1/1000 sampling rate).

In particular embodiments, the impact-metric may also be based on pre-determined values that function as weights (which may be, for example, multiplicative factors and/or additive terms in the calculation of the impact-metric) in the calculation of the impact-metric. As an example and not by way of limitation, text strings pre-determined by the social-networking system 160 to be important (e.g., text strings related to user login or new-user-experience, glossary/terminology text strings) may be weighted to bias the impact-metrics associated with those text strings toward a higher value. The exact value of a particular weight may depend on information about the respective text string, such as the feature that it belongs to or its purpose. In particular embodiments, the impact-metric of a particular text string may be based on the impact-metric of a different text-string. As an example and not by way of limitation, if the particular text string occurs in a user flow a user must go through before seeing a high-impact-score text string, the impact-metric of the particular text string may be increased.

In particular embodiments, the priority value may also be influenced by how close a current best translation for a text string is to a threshold reliability-value. There may be a particular range of values below the threshold reliability-value, such that a text string with a reliability-value in this particular range may receive an increase in its respective priority value. As an example and not by way of limitation, if the threshold reliability-value is 67%, a text string may receive an increase in its respective priority value if the reliability-value for its best translation is between 50% and 67% (e.g., 62%). One way of doing this is by employing an adjusted priority-value equation for the text string specifically, which may be represented as follows: priority value=impact-metric×(reliability-value of best translation). Another way is to simply increase the priority value by a pre-determined value. The goal of this increase in priority values may be to maximize the number of translations ready for publishing (e.g., deployed in "preview" mode) so that they may thereby become useful to the public more quickly. Increasing a text string's priority value may increase its exposure to potential contributors (e.g., the first user), this making it likely that a best translation of the text string will receive the necessary votes to be published. In particular embodiments, this increase in priority may not occur if there exists already a threshold number of credible up-votes for a translation for the text string. As an example and not by way of limitation, if the threshold is set to three and if a translation already has three credible up-votes (e.g., three up-votes by users having credibility-scores greater than 70%), the social-networking system 160 may not increase the priority of the corresponding text string, even if a best translation is within the particular range of values below the threshold reliability-value (e.g., between 50% and 67%). In particular embodiments, this increase in priority value may not occur unless other conditions for publishing, if any, are also satisfied. As an example and not by way of limitation, the social-networking system 160 may require that a translation receive at least a threshold number of credible up-votes (e.g., three up-votes by users having credibility-scores greater than 70%). In this example, the priority score of a text string may not be increased (e.g., by way of the adjusted priority-value equation), even if it is within the particular range of values below the threshold reliability-value, unless it has also received threshold number of credible up-votes. In particular embodiments, once the text string achieves the threshold reliability-value, the social-networking system 160 may stop increasing its priority value (e.g., by reverting to a non-adjusted priority-value equation).

In particular embodiments, the social-networking system 160 may also introduce a degree of randomness in the selection process, so that not every user who is sent a translation prompt at a given time sees the same text string (e.g., the text string with the highest priority value). This randomization may be useful because, for example, the marginal benefit for a translation contribution decreases with the number of total contributions so that it may be more beneficial for some users to contribute to the translation of a different (e.g., less prioritized) text string. Thus, randomization may effectively prevent the text strings with the highest priority value from unnecessarily monopolizing user time and effort—it may not be necessary (and in fact may be wasteful) for the top-priority-value text string to be translated by all available users at a given time. As an example and not by way of limitation, if one million users are willing to contribute to a translation, rather than selecting the same top-priority-value translation for all one million users, the social-networking system 160 may select (due to randomization), for some users, one or more text strings with a lower priority value. Relatedly, in particular embodiments, the social-networking system 160 may act to decrease the priority value, for a particular language, of a text string every time its translation is voted upon in the particular language. This again may serve to prevent certain text strings from monopolizing user time and effort.

In particular embodiments, a reliability-value of a translation of a first text string and/or a priority value of the first text string may be based on a reliability-value of a second text string and/or a priority value of the second text string, where the first and second text strings are related to each other. In particular embodiments, the first text string may be an inner text string that represents a subset of the second text string (i.e., an outer string). As an example and not by way of limitation, in the text string "You were tagged in a {=comment}," the token "{=comment}" may and the text string "tagged" may correspond inner text strings in the outer text string "You were tagged in a {=comment}." Reliability-values of translations of the first/inner text string and second/outer text string may depend on each other. As an example and not by way of limitation, a translation of the first/inner text string may have an increased reliability-value if a translation of the second/outer text string has a relatively high reliability-value (or vice versa). Similarly, priority values of the first/inner text string and second/outer text string may depend on each other. As an example and not by way of limitation, the second/outer text string may have an increased priority value if the first/inner text string has a relatively high priority value (or vice versa). As an example and not by way of limitation, if the first/inner text string does not yet have a threshold number of credible votes for any of its translations (such that there is a reliable translation for it that can be published), the priority value of the second/outer text string may be decreased (e.g., because it may not be ideal for users to be translating a second/outer text string when a first/inner text string does not yet have a reliable translation). In particular embodiments, the first/inner text string may be a "glossary" string, which is a string that is frequently used in many second text strings on the online social network. It may be particularly important to have consistent translations for such strings, and they may receive relatively high priority values. In particular embodiments, the first text string may not be an inner string of the second text string, but may instead be a text string that is frequently published along with the second text string. As an example and not by way of limitation, the text string "like" may often be published together with the text string "comment," and may therefore be related enough to be first and second text strings.

In particular embodiments, a second text string (e.g., an outer text string) may not be published until a related first text string (e.g., an inner text string) has met the criteria for publishing. As an example and not by way of limitation, the translation for "You were tagged in a {=comment}" may not be published until the translation for "{=comment}" has met the criteria for publishing (e.g., by having a translation with a threshold reliability-value, by having a threshold number of credible up-votes, etc.).

Figure 3:
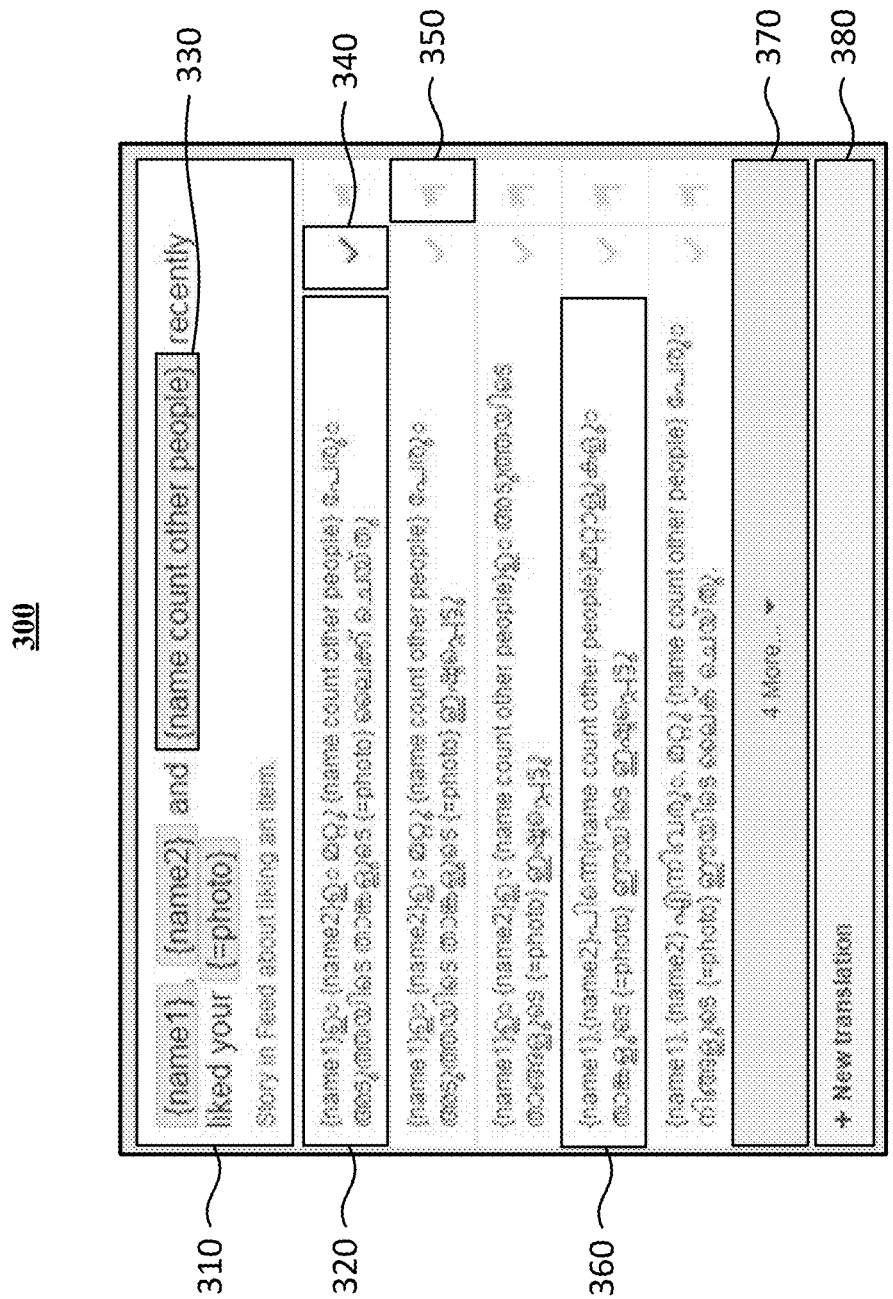
FIG. 3 illustrates an example translation prompt.

In particular embodiments, the social-networking system 160 may send, to a client system of a first user, instructions configured to present one or more translation prompts. The translation prompt may prompt the first user to contribute to the translation of the first text string. FIG. 3 illustrates an example translation prompt 300. In particular embodiments, the translation prompt may be directed to translating the first text string into a particular language and may prompt the user to contribute to a translation of the first text string in the particular language. The translation prompt may include the first text string and one or more translation-input fields. As an example and not by way of limitation, referencing FIG. 3, the translation prompt 300 may include the first text string in element 310 and several translation-input fields, including translation-input fields 340 and 350. The first text string may be structured to include "tokens," or placeholders, that reference persons or concepts that are to be inserted into the first text string. The referenced persons or concepts that are inserted may vary based on the individual circumstances that are applicable to a particular rendering of an individual instance of the first text string. As an example and not by way of limitation, referencing FIG. 3, the first text string (e.g., "{name1}, {name2} and {name count other people} recently liked your {=photo}") may include four tokens. In this example, the tokens {name1} and {name2} may be references to two particular persons who liked a particular photo associated with the first user, and the names of the two particular persons (e.g., "Luis," "Ahmed") may be inserted in place of the tokens when the first text string is rendered. Similarly, in the same example, the token {name count other people} (illustrated as the token 330 in FIG. 3) may be a placeholder that references the total number of people who liked the particular photo, and a representation of the total number (e.g., "12") may be inserted in place of the token when the first text string is rendered. In particular embodiments, a translation may have these tokens positioned anywhere within, as appropriate to specific syntax structure rules of the associated language. As an example and not by way of limitation, the position of the token {name} in the text string "you've listed {name} as a close friend" may vary according to the language associated with the respective translation. The use of tokens may allow the translations to not be rigidly bound to a particular syntax structure of any particular language. Even within a language, there may be different ways of structuring a translation. As an example and not by way of limitation, referencing FIG. 3, the relative positions of the tokens {name1} and {name2} are different in the translations corresponding to elements 320 and 360. Although this disclosure describes sending instructions configured to present a particular translation prompt to a particular user in a particular manner, it contemplates using any suitable means of receiving a submission related to translations from any suitable user in any suitable manner.

In particular embodiments, the translation prompt may include a description of a context of the first text string and/or instructions for translating the first text string. As an example and not by way of limitation, referencing FIG. 3, the element 310 may include a description of the context in which the first text string appears on the online social network (e.g., "Story in Feed about liking an item."). The description and/or instructions may be in a language into which the first text string is to be translated. Alternatively, the description and/or instructions may be in a language that is different from the particular language into which the first text string is to be translated. In particular embodiments, the translation prompt may include a translation of the first text string in a "reference language," which may be different from the language into which the first text string is to be translated. The reference language may be a secondary source for the first user that may provide some additional context for translating the text string into the particular language. As an example and not by way of limitation, the reference language may be a language that the first user may be familiar with. In particular embodiments, the translation prompt may include a description and/or instructions in the reference language. In particular embodiments, the first user may be able to select the language of the description and/or instructions.

In particular embodiments, the translation-input fields may be configured to accept one or more inputs from the first user that may contribute to determining a best translation for the first text string. In particular embodiments, a translation-input field may be configured to accept a text string, a media item (e.g., an image file, a video recording), or other means of input that may allow the first user to construct a first translation for the first text string. As an example and not by way of limitation, referencing FIG. 3, the translation-input field 380 may be configured to accept a text string or an audio/video/image input that may be a translation for the first text string displayed in element 310. In particular embodiments, the translation prompt may be configured to accept more than one translation for the first text string from the first user. This may be necessitated by language rules. As an example and not by way of limitation, some languages may necessitate different translations for expressing an idea captured by the first text string, even though the reference language may not so necessitate according to its own rules. For example, a translation of the first text string may have to be varied depending on the gender (i.e., masculine, feminine, neuter) of a subject or object of a sentence. In this example, in French, the text string "I am happy" may be translated to "Je suis heureux" or "Je suis heureuse" depending on the gender of the subject (which may be, for example, the first user). Similarly, in French, the text string "They like dogs" may be translated to "Ils aiment les chiens" or "Elles aiment les chiens," depending on the gender of the subject of the sentence (i.e., "they"). Some languages may also have different translations depending on a number associated with a noun. For example, in Russian, the word for "books" in the translation of the text string "two books" may be different from the word for "books" in the translation of the text string "six books." The social-networking system 160 may allow the first user to specify any such rule and submit multiple translations to account for such a rule. As an example and not by way of limitation, the first user, for a translation prompt directed to translating the text string "I am happy" into French, may input two strings (e.g., "Je suis heureux" and "Je suis heureuse") and specify that one corresponds to a masculine subject and the other corresponds to a feminine subject.

In particular embodiments, the translation prompt may include one or more translation-input fields that are associated with a set of possible translations. As an example and not by way of limitation, each of these translation-input fields may be associated with a particular translation. For example, referencing FIG. 3, the translation-input field 340 may be associated with the particular translation displayed within element 320. The order in which the translations are displayed may be based on their respective reliability-values. As an example and not by way of limitation, the translations may be displayed in descending order of their respective reliability-values, displaying the translations having the highest reliability-values values first. In particular embodiments, the social-networking system 160 may intersperse translations having low reliability-values with translations having high reliability-values. Among other purposes, this may serve to spot-check the user to help determine the user's credibility-score. It may also ensure greater diversity in the displayed translations. The first user may select a translation-input field associated with a translation to contribute to translating the first text string. As an example and not by way of limitation, referencing FIG. 3, the first user may be able to select the translation-input field 340, which may correspond to an up-vote (e.g., a vote in favor of the associated translation). The user may also be able to later unselect the translation-input field 340, which may correspond to a retraction of the up-vote. In particular embodiments, the translation prompt may also allow the first user to submit a down-vote (e.g., a vote against the associated translation). As an example and not by way of limitation, referencing FIG. 3, the translation prompt 300 may include the translation-input field 350, which may be configured to receive an input that corresponds to a down-vote. In this example, the translation-input field may be configured to accept more specific inputs that may allow the first user to specify a problem with the associated translation. In particular embodiments, the social-networking system 160 may allow the first user to submit a down-vote along with a specific response that details why a translation is suboptimal. As an example and not by way of limitation, when the first user selects the translation-input field 350, the first user may be presented with a menu of selectable input fields that may correspond to specific responses such as the following: "Wrong style or wording"; "Grammar or spelling errors"; "Wrong meaning"; "Abusive or offensive." In particular embodiments, as described above, the first user may submit a new translation (e.g., by submitting a text string at the translation-input field 380. In particular embodiments, the description and/or instructions of a translation prompt may include one or more specific questions about a translation for the first user. As an example and not by way of limitation, the description and/or instructions may include the question, "Does this translation use the correct vocabulary term(s)?" As another example and not by way of limitation, the description and/or instructions may include the question, "Does this translation use the correct punctuation?" The first user may submit responses to these questions using an associated translation-input field.

In particular embodiments, the social-networking system 160 may restrict, in any suitable manner, the inputs that may be submitted by the first user. As an example and not by way of limitation, the social-networking system 160 may only allow the first user to submit a single up-vote in a set of translations. As another example and not by way of limitation, the social-networking system 160 may not allow the first user to both submit an up-vote on one of the displayed translations and also submit a new translation. In particular embodiments, the set of translations may include translations that are pre-populated by the social-networking system 160. These translations may have been individually pre-programmed or may have been machine-translated (either natively or using a third-party system). In particular embodiments, the set of translations may include translations that were submitted by other users of the online social network. In particular embodiments, only submitted translations that have a minimum reliability-value may be included in the set. In particular embodiments, the translation prompt may only display a subset of the set of translations. The translation prompt may include a selectable interactive element that may allow the user to request additional translations from the set. As an example and not by way of limitation, the first user may be able to select the show-more element 370, in response to which the social-networking system 160 may display additional translations (e.g. four additional translations). This feature may be particularly useful in saving screen space, and may be especially useful for a client system with a small screen, such as a mobile client system. In particular embodiments, the additional translations may be a subset that replaces the currently displayed subset of translations, and the first user may be able to switch among different subsets. Alternatively, the additional translations may be displayed in addition to some or all of the currently displayed subset of translations. In particular embodiments, the translation prompt may include a selectable interactive element that corresponds to a "none of the above" option. Selecting the "none of the above" interactive element may cause the social-networking system 160 to present additional translations by any of the methods described above.

Figure 4:
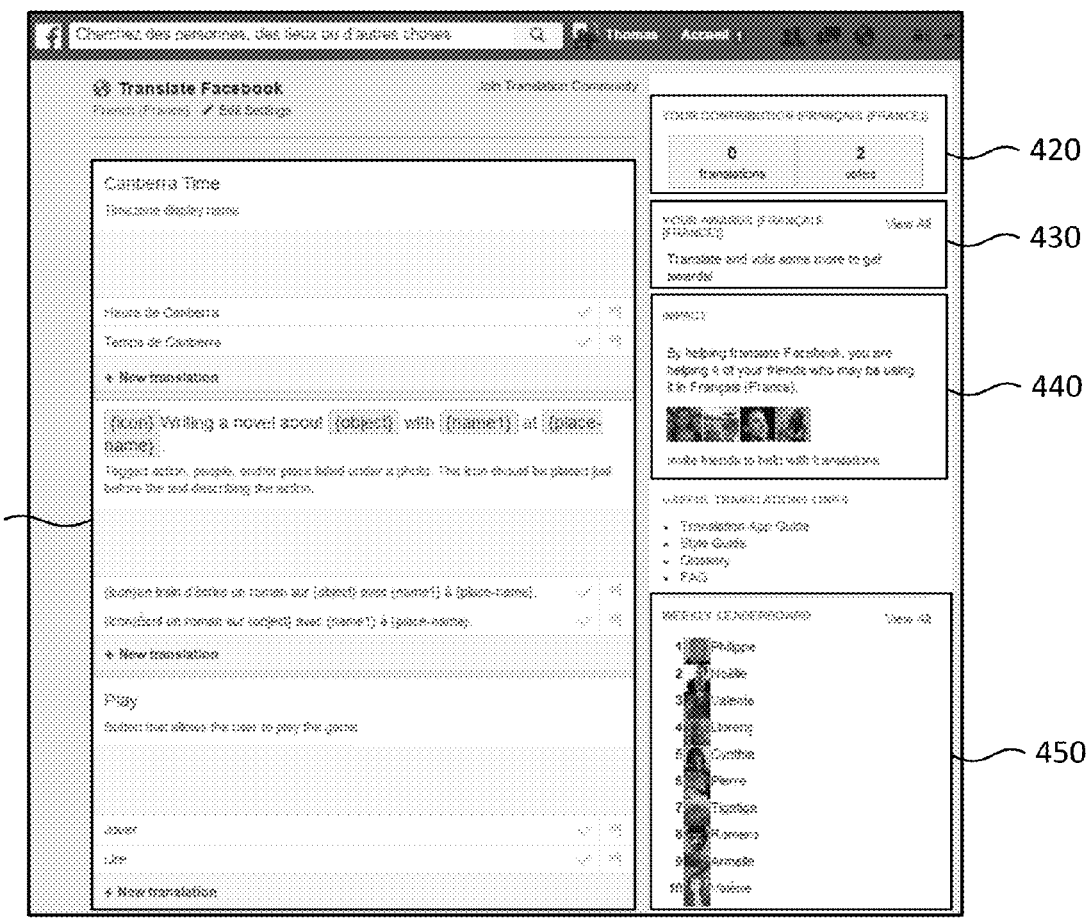
FIG. 4 illustrates an example of a dedicated translations interface including several translation prompts.
Figure 5:
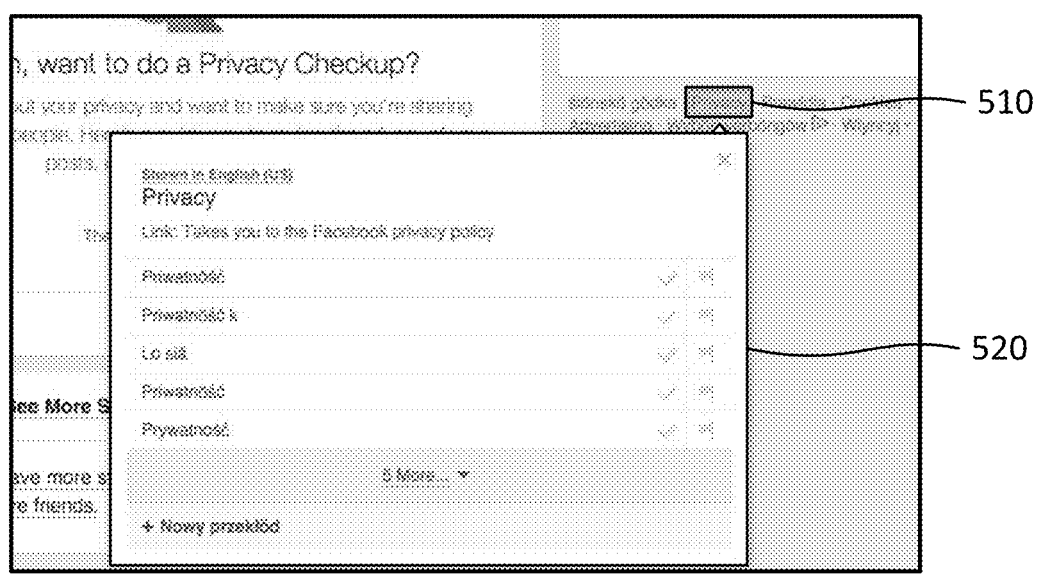
FIG. 5 illustrates an example in-line-translation interface.

In particular embodiments, a translation prompt may be presented to the first user as part of a dedicated translations interface that the first user may visit for the specific purpose of submitting translations (e.g., a page of the online social network dedicated to translations, an interface of a translations application). FIG. 4 illustrates an example of a dedicated translations interface including several translation prompts. The dedicated translations interface may be presented to the first user in response to a user having submitted an input indicating an interest in contributing to translations (e.g., by submitting a new translation or a vote on an existing translation, by visiting the page/interface) on the online social network or an associated application. In rendering the dedicated translations interface, the social-networking system 160 may send instructions configured to present one or more translation prompts. As an example and not by way of limitation, referencing FIG. 4, the social-networking system 160 may have sent at least the three translation prompts displayed within element 410. Additionally or alternatively, in particular embodiments, a translation prompt may be presented on any other interface (e.g., on the online social network). As an example and not by way of limitation, a translation prompt may be presented within a module or other subpart of a newsfeed of the online social network. In this example, the translation prompt may appear as part of a newsfeed being browsed by the first user, and the first user may choose to contribute to a translation with minimal interruption to the user experience of the first user. As other examples and not by way of limitation, the translation prompt may be presented within a display state of a client system (e.g., a mobile device), within a popup box or a modal window, or within some other suitable region on a screen. In particular embodiments, the social-networking system 160 may allow the first user to perform in-line editing of text strings on an interface of the online social network that may not be related to translations. The first user may be able to trigger an in-line-translation interface that presents a translation prompt by submitting a suitable input. FIG. 5 illustrates an example in-line-translation interface 520. The in-line-translation interface 520 in this example, which prompts the user to translate the text string "privacy" into Polish, may have been triggered by the first user selecting an associated text string on an interface of the online social network. In this example, the in-line-translation interface 520 may have been triggered by the user selecting (e.g., pressing and holding for a period of time on a touch screen, right-clicking and indicating an intent to contribute to a translation) the element 510, which includes the text string "privacy."

In particular embodiments, the first user may be associated with a credibility-score. The credibility-score may serve as a measure of the first user's credibility in translating text strings such as the first text string. The credibility-score may be represented by a number, a percentage, a rank, a rating, or another suitable measure. The credibility-score may be based on any combination of one or more factors associated with the first user. In particular embodiments, the credibility-score may be based on prior translation activity of the first user. In calculating the credibility-score based on prior translation activity, the social-networking system 160 may consider previous submissions (e.g., up-votes, down-votes, new translations) of the first user and determine a frequency with which the submissions were correct. The social-networking system 160 may determine that a previous submission was correct based on a current reliability-value of the translation associated with the submission. As an example and not by way of limitation, the first user may have submitted an up-vote for a particular translation, which may have a high reliability-value, in which case the social-networking system 160 may determine that the submission was correct. In particular embodiments, the social-networking system 160 may actively perform a spot-checking process and base the credibility-score of the first user on the results of the spot-checking process. In particular embodiments, the spot-checking process may include sending at random, or at regular intervals, instructions configured to present translation prompts ("checker-translation prompts") to the first user prompting the first user to translate a control string. The control string may be a text string for which the social-networking system 160 already knows the optimal translation. As an example and not by way of limitation, the control string may be taken from a curated list of text strings (e.g., text strings that were professionally translated). As another example and not by way of limitation, the control string may be a text string for which a reliability-value is sufficiently high for it to be deemed highly reliable. Although this disclosure describes credibility-scores being determined in a particular manner, it contemplates determining any suitable measure of user credibility in any suitable manner.

Figure 6:
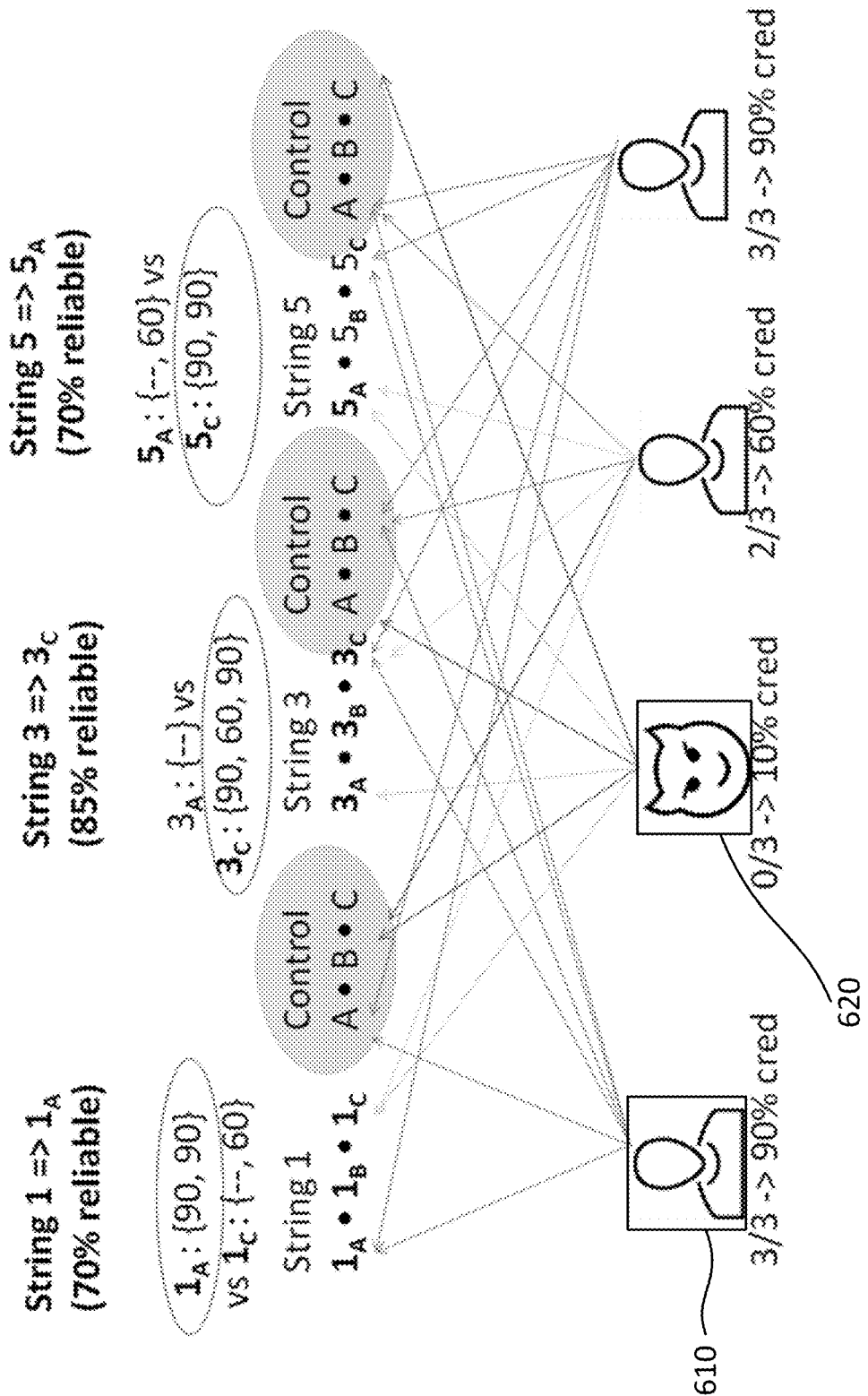
FIG. 6 illustrates an example credibility-checking process for determining the reliability of translations.

In particular embodiments, the credibility-score for the first user may be based on a percentage of submissions that were correct, as determined by a spot-checking process. FIG. 6 illustrates an example spot-checking process for calculating credibility-scores of users. FIG. 6 illustrates a representation of four users who have each been presented with six translation prompts for six different strings—String 1, String 3, String 5, and three different control strings. In this example, the social-networking system 160 may determine, for each of the four users, a credibility-score based on the percentage of control-string submissions that were correct. For example, the user 610 may have gotten 100% of the control-string submissions correct and may consequently receive a relatively high credibility-score (e.g., a credibility-score of 90%). By contrast, the user 620 may have gotten 0% of the control-string submissions correct and may consequently receive a relatively low credibility-score (e.g., a credibility-score of 10%). As illustrated by this example, the percentage of correct submissions does not necessarily translate directly to the credibility-score. As explained herein, there are other factors that shape the credibility-score. In particular embodiments, the credibility-score may never be exactly 100% or 0%, because in those embodiments, the social-networking system 160 may not be able to determine for certain that a user is completely credible or not credible.

In particular embodiments, the credibility-score may be based on the number of spot-checks that the first user has undergone. As an example and not by way of limitation, if User 1 has a 90% success rate with translating ten control strings and User 2 has a 90% success rate with translating twenty control strings, User 2 may receive a higher credibility-score. In particular embodiments, the first user may be kept on a probationary status until the first user has made a minimum number of submissions, such that the first user's submissions are not registered while the first user is on this probationary status. One method of achieving this may be to assign a relatively low credibility-score (e.g., a credibility-score of 10) to the first user until the first user has made the minimum number of submissions. In particular embodiments, the social-networking system 160 may determine unique credibility-scores for users of the online social network based on any combination of the above factors.

In particular embodiments, the first user may be associated with a single general credibility-score that reflects a general credibility of the first user in translating text strings. Alternatively or additionally, the first user may be associated with one or more language-specific credibility-scores. As an example and not by way of limitation, the first user may have a credibility-score associated with Filipino and a different credibility-score associated with Swahili. In this example, the credibility-score associated with Filipino may be based on prior translations of text strings from or into Filipino, and the credibility-score associated with Swahili may be based on prior translations of text strings from or into Swahili. As another example and not by way of limitation, the language-specific credibility-scores may be based on other relevant factors described below such as the profile information of the first user (e.g., profile information of the user listing Filipino as a first language, profile information of the user listing the Philippines as a country of birth, the number of friends of the user listing Filipino as a first language). In particular embodiments, the first user may receive different credibility-scores for the different types of inputs that may be submitted by the first user in contributing to a translation. As an example and not by way of limitation, the first user may have a credibility-score for up-votes, a credibility-score for down-votes, and a credibility-score for new translations. In this example, each of the different credibility-scores may be based on the first user's prior translation activity with the respective type of input (but it may also consider prior translation activity with other types of inputs, which may, for example, be weighted less in the calculation of the respective credibility-score).

In particular embodiments, the credibility-score of the first user may be based on one or more languages associated with the first user. As an example and not by way of limitation, the first user may have a higher credibility-score associated with the language Filipino if the first user is somehow associated with that language. Such an association may be indicative of a language proficiency of the user in the associated language. The social-networking system 160 may determine that the first user is associated with a language based on an explicit indication by the first user to that effect, for example, within the profile information of the first user. As an example and not by way of limitation, the social-networking system 160 may determine that the first user is associated with the language Filipino if the first user has included that information as part of the profile information of the first user. The social-networking system 160 may determine that the first user is associated with a language based on a history of activity of the first user on the social-networking system 160, which may be stored on the social graph. As an example and not by way of limitation, the social-networking system 160 may determine that the first user is associated with the language Filipino if the first user frequently authors communications on the social-networking system 160 in Filipino, interacts with Filipino communications (e.g., by "liking" a comment that is in Filipino), or accesses Filipino content (e.g., videos in Filipino). Similarly, the social-networking system 160 may determine such a language association based on a history of activity on a client system of the first user. As an example and not by way of limitation, the social-networking system 160 may access text messages, device language settings, or other sources of information stored locally on the client system of the first user to determine that the first user may be associated with the language Filipino. In particular embodiments, the credibility-score of the first user may be based on one or more attributes of the first user, such as demographics (e.g., age, gender, hometown, nationality, ethnicity). As an example and not by way of limitation, a fifty-year-old first user may have a higher credibility-score than an eighteen-year-old first user (e.g., if the social-networking system 160 determines that the average of the individual credibility-scores of all fifty-year old users is greater than the average of the individual credibility-scores of all eighteen-year-old users). In particular embodiments, the credibility-score may be based on a current geo-location of the first user. As an example and not by way of limitation, a first user who lives in Manila, Philippines (e.g., as determined by geo-location information submitted by the client system of the first user while accessing the social-networking system 160) may receive a higher credibility-score for Filipino translations than otherwise. In particular embodiments, the credibility-score may be based on an engagement level of the first user on the online social network. As an example and not by way of limitation, a first user who regularly makes use of the online social network (e.g., a user who authors posts or browses content frequently on the online social network, a user who likes comments frequently) may have a higher credibility-score than a first user who does not similarly make use of the online social network. In particular embodiments, the credibility-score may be based on non-language-related activity of the first user. Such activity may be classified by the social-networking system 160 as corresponding to either a positive or a negative measure of trustworthiness of the first user. (e.g., on the social-networking system 160). As an example and not by way of limitation, a first user who frequently donates to causes may receive a higher credibility-score than otherwise (e.g., because such a user may be less likely to behave maliciously and deliberately submit incorrect translations). As another example and not by way of limitation, a first user who frequently "likes" posts related to rescuing abused dogs on the online social network may receive a higher credibility-score than otherwise. By way of a contrasting example and not by way of limitation, a first user who frequently "likes" posts related to "trolling" or other malicious behavior (e.g., memes including the words "successful troll is successful") may receive a lower credibility-score than otherwise. In particular embodiments, the credibility-score of the first user may be based on a credibility measure associated with one or more concepts associated with the first user. As an example and not by way of limitation, a first user who likes or frequently visits pages related to pranks may receive a lower credibility-score than otherwise (e.g., because it is more likely that such a user would "prank" the system by deliberately submitting incorrect translations).

In particular embodiments, the credibility-score of the first user may be based on the credibility-scores of other users who are social connections of the first user (e.g., first- or second-degree social connections on the social-networking system 160). As an example and not by way of limitation, the first user may receive a higher credibility-score if a large number of first-degree social connections of the first user have a high credibility-score (e.g., because a user may be more likely to be credible if he or she frequently associates with credible people). In particular embodiments, the credibility-score of the first user may be based on languages associated with these social connections of the first user. As an example and not by way of limitation, the first user may be more likely to be proficient in the language Hindi if the first user has a large number of social connections who are proficient in that language (e.g., by being associated with the language, as described above). In particular embodiments, the credibility-score of the first user may be based on social-graph information associated with social connections of the first user. As an example and not by way of limitation, such information may include information about the social connections' attributes (e.g., demographics), geo-locations, activities, and any other similarly suitable data.

In particular embodiments, the social-networking system 160 may receive, from the client system, an input by the first user at the translation-input field. The input may correspond to one or more translations for the first text string. The first user may submit any of the types of inputs described above using one or more translation-input fields of a translation. As an example and not by way of limitation, an input by the first user may be an up-vote for a first translation of the first text string. As another example and not by way of limitation, an input by the first user may be a string that corresponds to a new first translation of the first text string. In particular embodiments, the social-networking system 160 may also receive, along with an input by the first user, a user identifier sent by the client system of the first user that may associate the input with the first user. The social-networking system 160 may interpret a received input into one or more suitable input values that correspond to one or more translations associated with the first text string. As an example and not by way of limitation, as described above, the first user may submit inputs at respective translation-input fields that may be interpreted as up-votes or down-votes. As another example and not by way of limitation, an input corresponding to selection of a "none of the above" interactive element may be interpreted as down-votes for each of the translations displayed in the translation prompt. As another example and not by way of limitation, the first user's response of "No" to the specific question, "Does this translation use the correct punctuation?" may be interpreted as a down-vote or a partial down-vote for the translation. The inputs described herein may be submitted by a plurality of other users in a similar manner, and the social-networking system 160 may receive those inputs and associate them with one or more translations as described herein. In particular embodiments, the inputs may be submitted by a machine-translation algorithm that may similarly be received and associated with one or more translations as described herein. Although this disclosure describes receiving and interpreting particular inputs from a particular user in a particular manner, this disclosure contemplates receiving and interpreting any suitable input from any suitable user in any suitable manner.

In particular embodiments, the social-networking system 160 may interpret an input as corresponding to one or more implicit "not-votes." An implicit not-vote may be an input value that is not explicitly specified by the input, but may be inferred from it. As an example and not by way of limitation, an implicit not-vote may be registered for a particular translation, $T_1$, when the first user up-votes another translation, $T_2$ (and thus not voting for $T_1$). In particular embodiments, an implicit not-vote may be treated as a down-vote. Alternatively, it may be treated as a "weak-down-vote," which may be an input value that is weighted less than an explicit down-vote. As an example and not by way of limitation, a weak-down-vote may be weighted half as much as an explicit down-vote, such that it may take two weak-down-votes to equal a down-vote. The concept of the implicit not-vote may operate on the principle that because the first user up-voted $T_2$ and not $T_1$, the first user may have implicitly indicated that the $T_1$ may be inferior. In particular embodiments, when the first user selects a particular translation, the social-networking system 160 may register implicit not-votes for all the other translations for the associated text string. As an example and not by way of limitation, referencing FIG. 3, if the first user has up-voted the translation displayed within the element 320, all the other translations for the text string (including the four additional translations that may have been displayed if the user selected the show-more element 370). In particular embodiments, the social-networking system 160 may register implicit not-votes only for the other translations that have already been displayed to the first user. As an example and not by way of limitation, if only a subset of the translations have been sent and displayed to the first user and the first user has not been sent or displayed any of the other additional translations, an up-vote by the first user for a particular translation may only be registered as implicit not-votes for the translations in the subset that was sent and displayed to the first user. The concept of implicit not-voting may be useful in offsetting the bias toward translations that have existed for a long time. As an example and not by way of limitation, an old translation that has existed for a year may have in its favor all the up-votes that were submitted toward it during that year, while a new translation that has existed only for a month may have only the up-votes submitted toward it for that month (which may be much fewer in number). In this example, even if the new translation is markedly better, it may be a long time before it can catch up to the old translation in terms of the number of up-votes. This may be especially true if the new translation is only marginally better than the old translation. Implicit not-voting may act to allow the new translation to catch up faster by giving more weight to subsequent votes for the corrected translation. As an example and not by of limitation, an up-vote for the new translation may be treated as both an up-vote for the new translation and a down-vote for the old translation, thus favoring the new translation highly. In a similar manner, implicit not-voting may be useful in suppressing poor translations by allowing users to increase their down-vote potential. As an example and not by way of limitation, if the first user down-votes a poor translation and also up-votes a better translation, the poor translation may end up with both a down-vote and an implicit not-vote.

In particular embodiments, the social-networking system 160 may calculate, by one or more of the computing devices, a reliability-value for the first translation based on the input. The reliability-value of the first translation may reflect a probability that the first translation is optimal. In particular embodiments, the reliability-value of the first translation may be based on a plurality of input values from one or more users who made translation submissions for the first text string. The social-networking system 160 may determine, for each possible input value, the number of users who submitted that input value. The social-networking system 160 may calculate the reliability-value based on the determined numbers. As an example and not by way of limitation, the social-networking system 160 may determine the number of users who submitted up-votes, the number of users who submitted down-votes, and the number of users determined to have submitted implicit not-votes (e.g., by up-voting a different translation), and calculate an appropriate reliability-value based on those numbers. In this example, if a large number of users submitted up-votes for the first translation and only a small number of users submitted down-votes or implicit not-votes, the first translation may, all else equal, have a higher reliability-value than if the converse were true. Although this disclosure describes calculating a reliability-value in a particular manner, it contemplates calculating any measure of reliability in any suitable manner.

In particular embodiments, the reliability-value for the first translation may further be based on the credibility-scores of the users who contributed to the first translation. As an example and not by way of limitation, the calculation of the reliability-value for the first translation may be represented by the following simplified equation: $R=f_s(f_u(u1, u2, u3, \ldots)-f_d(d1, d2, d3, \ldots)-f_n(n1, n2, n3, \ldots), \ldots)$, where R represents the reliability-value of the first translation, $f_s$ represents a scaling function that produces an output between 0% and 100%, $f_u$ represents a function calculating a positive-reliability-value for the first translation based on the credibility-scores of all the users who submitted up-votes for the first translation, $f_d$ represents a function calculating a reliability-value based on the credibility-scores of all the users who submitted down-votes for the first translation, and $f_n$ represents a function calculating a reliability-value based on the credibility-scores of all users determined to have submitted implicit not-votes for the first translation (e.g., by the act of submitting up-votes for a different translation). In particular embodiments, $f_d$ and $f_n$ may be the same such that an implicit not-vote is treated as the same as a down-vote. Alternatively, an implicit not-vote may be treated as less of a negative factor, such that the reliability-value is not as affected by an implicit not-vote as it is by a down-vote. The social-networking system 160 may weight the respective input values submitted by the users based on their respective credibility-scores, such that an input value of a user with a relatively high credibility-score is weighted more highly than an input value of a user with a lower credibility-score. FIG. 6 further illustrates the concept of calculating reliability-values based on the credibility-scores of contributing users. As an example and not by way of limitation, referencing FIG. 6, there may be three possible translations for String 1: $1_A$, $1_B$, and $1_C$. In this example, two users with credibility-scores of 90 may have submitted up-votes for translation $1_A$, and two users with credibility-score of 60 and 10 may have submitted up-votes for translation $1_C$. Based on this, the social-networking system 160 may calculate reliability-values for both translations. For example, the social-networking system 160 may calculate the value of $f_u(90, 90)-f_n(10, 60)$, which may result in a reliability-value of 70, which may reflect that the translation $1_A$ is 70% reliable, as illustrated in FIG. 6. As described above, the calculation weights the input values submitted by the two users with relatively high credibility-scores (90, 90) more highly than the input values submitted by the two users with relatively low credibility-scores (10, 60). Consequently, in this example, despite the fact that two users submitted up-votes and two users submitted down-votes, because the two users who submitted up-votes had higher credibility-scores, their input values were weighted more highly. In particular embodiments, the social-networking system 160 may not register input values submitted by users who are below a threshold credibility-score. This may be directed at preventing malicious users, who are likely to have low credibility-scores, from deliberately sabotaging translations. It may also prevent well-meaning users who do not have the requisite proficiency in a particular language for identifying optimal translations. Similarly, it may prevent users who might be confused by the interface of the translation prompt (e.g., users not realizing that the translation prompt asks them to contribute to the translation of the first text string). As an example and not by way of limitation, the social-networking system 160 may not base the reliability-value on up-votes, down-votes, or implicit not-votes submitted by a user below a threshold credibility-score of 60. In this example, referencing FIG. 6, the reliability-values of translations $1_A$ and $1_C$ may not be based on the input value submitted by the user 620 (e.g., for having a credibility-score of 10). As another example and not by way of limitation, the social-networking system 160 may not register any new translations submitted by users below the threshold credibility-score. In particular embodiments, the social-networking system 160 may have a malicious-user-threshold credibility-score, such that a user having a credibility-score below such threshold would be treated as a malicious user, at least for a period of time (e.g., a period during which the user maintains a credibility-score below the malicious-user-threshold credibility-score). As an example and not by way of limitation, referencing FIG. 6, the user 620 may be treated as a malicious user (e.g., because the credibility-score of the user 620 may be below the malicious-user-threshold credibility-score). In particular embodiments, the social-networking system 160 may penalize translations for which a malicious user has submitted an up-vote by reducing the respective reliability-value (alternatively or additionally, the social-networking system 160 may increase the reliability-values of the other translations).

In particular embodiments, the social-networking system 160 may calculate the reliability-value for a translation $T_x$ (e.g., the first translation) as follows $$R(T_x) = \frac{Prob(T_x \text{ is best})}{Prob(\text{none is best}) + \sum_{all\ i} Prob(T_i \text{ is best})},$$

where $Prob(T_x$ is best) is an estimate of the probability that translation $T_x$ is the best translation for the target string (e.g., the first text string), $\Sigma_{all\ i} Prob(T_i$ is best) is the sum of the individual estimates of the probability computed separately for each available translation (including translation $T_x$) for the same target string (different values of i refer to different translations), and Prob(none is best) is an estimate of the probability that none of the available translations for the same target string is the best translation for the target string. In particular embodiments, the probability that translation $T_i$ is best, Prob($T_i$ is best), may be computed as: Prob($T_i$ is best)=Prob(votes for $T_i$ are good)×Prob(votes against $T_i$ are bad), where "vote" may includes any action, input (e.g., up-vote, down-vote, new translation, implicit not-vote), or other information that may be interpreted as being in favor of or against $T_i$ being a good or optimal translation for the target string. In particular embodiments, Prob($T_i$ is best), may be computed as:

Prob($T_i$ is best)=Prob(all upvotes for $T_i$ are good)×
Prob(all upvotes NOT for $T_i$ are bad)×Prob(all antivotes for $T_i$ are bad)×Prob(all antivotes NOT for $T_i$ are good), where "up-votes" may include up-votes, new translation submissions (e.g., a submission of a new translation $T_i$ may count as an up-vote for $T_i$), and/or other kinds of inputs may indicate that a user thinks $T_i$ is a good or optimal translation, and where "antivotes" include down-votes, implicit not-votes, and/or other kinds of inputs that indicate that a user does not think that translation $T_i$ is a good or optimal translation. Similarly, the probability that none of the available translations is good can be computed as:

Prob(none is best)=Prob(all upvotes for all translations are bad)×Prob(all antivotes for all translations are good).

The probability of the up-votes and antivotes for $T_i$ being either good or bad may in turn be computed from the credibility-scores of the users submitting these votes. As an example and not by way of limitation, using the following notation:

$C_{up}(U_j)$=the up-voter credibility of user $U_j$ (e.g., % of past spot-checked up-votes from user $U_j$ that were correct)

$C_{trans}(U_j)$=the translator credibility of user $U_j$ (e.g., % of past spot-checked submitted new translations from user $U_j$ that were correct)

$C_{down}(U_j)$=the down-voter credibility of user $U_j$ (e.g., % of past spot-checked down-votes from user $U_j$ that were correct)

$C_{not}(U_j)$=the not-voter credibility of user $U_j$ (e.g., prob of implicit not-votes from user $U_j$ being correct, e.g., this can be estimated by using the value of $C_{up}(U_j)$ since the correctness of the implicit not-vote goes along with the correctness of the original up-vote that implied the not-vote), then:

$$Prob(\text{all upvotes for } T_i \text{ are good}) = C_{trans}(U_{T_i}) \times \prod_{\text{for all } j \text{ where user } U_j \text{ upvoted } T_i} C_{up}(U_j)$$

(where $C_{trans}(U_{T_i})$ is the translator credibility of the user who submitted translation $T_i$ as a new translation)

$$Prob(\text{all upvotes NOT for } T_i \text{ are bad}) = \prod_{\text{for all } j \text{ where translation } T_j \text{ is not } T_i \text{ and user } U_{T_j} \text{ submitted } T_j} (1 - C_{trans}(U_{T_j})) \times$$
$$\prod_{\text{for all } k \text{ where user } U_k \text{ upvoted something other than } T_i} (1 - C_{up}(U_k))$$

$$Prob(\text{all antivotes for } T_i \text{ are bad}) = \prod_{\text{for all } j \text{ where user } U_j \text{ downvoted } T_i} (1 - C_{down}(U_j)) \times$$
$$\prod_{\text{for all } k \text{ where user } U_k \text{ has an implict not-vote on } T_i} (1 - C_{not}(U_k))$$

-continued $$\text{Prob}(\text{all antivotes NOT for } T_i \text{ are good}) =$$

$$\prod_{\text{for all } j \text{ where user } U_j \text{ downvoted something other than } T_i} C_{down}(U_j) \times$$

$$\prod_{\text{for all } k \text{ where user } U_k \text{ has an implicit not-vote on something other than } T_i} C_{not}(U_k)$$

$$\text{Prob}(\text{all upvotes for all translations are bad}) =$$

$$\prod_{\text{for all } j \text{ where user } U_{T_j} \text{ submitted a translation for the target string}} (1 - C_{trans}(U_{T_j})) \times$$

$$\prod_{\text{for all } k \text{ where user } U_k \text{ upvoted a translation for the target string}} (1 - C_{up}(U_k))$$

$$\text{Prob}(\text{all antivotes for all translations are good}) =$$

$$\prod_{\text{for all } j \text{ where user } U_j \text{ downvoted a translation for the target string}} C_{down}(U_j) \times$$

$$\prod_{\text{for all } k \text{ where user } U_k \text{ has an implict not-vote on a translation for the target string}} C_{not}(U_k)$$

In particular embodiments, the social-networking system 160 may impose a preliminary threshold reliability-value, which may need to be surpassed before a translation is deemed reliable. As an example and not by way of limitation, the social-networking system 160 may impose a preliminary threshold reliability-value of 67%, such that any translation having a lower reliability-value may be deemed unreliable. When a translation is deemed reliable, it may be promoted to a status where it becomes available as a presumptive translation to at least a group of users. As an example and not by way of limitation, it may be displayed to the public in a probationary or "preview" mode. In this mode, the translation may still be challenged by users, who may be able to submit input values undermining the preview translation (e.g., by submitting new translations through in-line editing or otherwise, submitting down-votes). The social-networking system 160 may have a secondary threshold reliability-value, above which the translation may be deemed highly reliable. As an example and not by way of limitation, the social-networking system 160 may have a secondary threshold reliability-value 99.99%. When a translation is deemed to be highly reliable, one or more restrictions may be placed on the translation such that it may become harder for users to challenge the translation. As an example and not by way of limitation, users may not be able to submit new translations for a string that has a highly reliable translation or may at least have some restrictions imposed on how new translations may be submitted (e.g., they may not be able to be submitted through in-line editing). In this example, users may still be able to up-vote or down-vote the translation. In addition to the reliability-value thresholds, the social-networking system 160 may have other thresholds that may need to be satisfied. As an example and not by way of limitation, the social-networking system 160 may require a threshold number of votes for a translation before it can be accepted by the social-networking system 160 for a purpose (e.g., for displaying as a possible translation within a translation prompt, for displaying to the public in preview mode). For example, the social-networking system 160 may require that a translation receive at least three up-votes.

Threshold reliability-values may help the social-networking system 160 ensure that a desired level of accuracy is achieved in translations. The use of threshold reliability-values in this manner may be based on the Credibility Threshold Principle, which would dictate that if a translation for a text string is accepted (e.g., deemed reliable) only when the conditional probability of that translation being correct is at least some threshold $\upsilon$, then the probability of accepting a correct translation, averaged over all work entries, would be at least $\upsilon$. This principle may imply that if the conditional probability that the best translation for a text string so far is correct can somehow be computed, then the error rate (on average) may be mathematically guaranteed to be less than some desired error rate $\varepsilon_{acc}$, by not deeming the translation reliable until this conditional probability reaches the threshold $\upsilon = 1 - \varepsilon_{acc}$. More information on the Credibility Threshold Principle, the use of thresholds in this manner, and the use of credibility measures in general to reliably crowd-source information may be found in Luis F. G. Sarmenta, Volunteer Computing (2001) (Ph.D. dissertation, Massachusetts Institute of Technology).

In particular embodiments, the social-networking system 160 may gamify the crowdsourcing process to incentivize users to contribute to translations. The social-networking system 160 may have a standalone application for accepting translations or may have an interface/page that is dedicated to translations. FIG. 4 illustrates an example of the latter, generated for the first user. In particular embodiments, the social-networking system 160 may display a summary board of translation activity conducted by the first user (e.g., as a score to motivate the first user to make additional contributions). As an example and not by way of limitation, referencing FIG. 4, the "summary board" 420 indicates that the first user has not submitted any new translations but has submitted two votes on existing translations. In particular embodiments, the social-networking system 160 may award users badges, send motivating messages, or may display other information to encourage users to contribute. As an example and not by way of limitation, referencing FIG. 4, the "awards board" 430 may display all badges earned by the first user, if any. As another example and not by way of limitation, referencing FIG. 4, the "impact board" 440 may display an indication of the social connections of the first user (e.g., their profile pictures, their names, a total number) who use the online social network in the language that the first user is being prompted to translate, or who otherwise are associated with the language (whether or not they use the online social network in that language). This may convey to the first user the impact that the first user would be making on those social connections. In particular embodiments, the social-networking system 160 may keep track of the top contributors (e.g., users who contribute to the most translations, users who have the highest credibility-scores, users who most frequently contribute to the most reliable translations) and feature them on a leaderboard. The leaderboard may be updated regularly. As an example and not by way of limitation, referencing FIG. 4, the "leaderboard" 450 may be a weekly leaderboard that displays the top ten users of the week. The social-networking system 160 may have one or more "missions modes," where users are given text strings having to do with a specific subject or text strings of a specific type, depending on the mission selected. This may allow users to specialize and may ultimately yield better translations. Some missions may allow only certain actions (e.g., only up-voting/down-voting, only the submission of new translations). In particular embodiments, the social-networking system 160 may also send out notifications (e.g., to all users, to a user who has previously contributed, to a user who has never contributed) to encourage users to contribute. In particular embodiments, the social-networking system 160 may make use of social advertising to promote the translations tool (e.g., by allowing users to share with their friends their translation activity or badges). In particular embodiments, the first user may be prevented from viewing items that are not "visible" to the first user based on one or more privacy settings. As an example and not by way of limitation, if a particular user has specified privacy settings such the first user is not authorized to view any information about the particular user, a leaderboard displayed to the first user may not display the particular user, even if the particular user is a top contributor.

Although this disclosure focuses on translating text strings, it contemplates translating other types of content. As an example and not by way of limitation, the social-networking system 160 may allow for the translation of a media file (e.g., an audio file, a video file, an image file) or some other content that is not a text string. In this example, the social-networking system 160 may send, to the client system of the first user, instructions configured to present a translation prompt including the media file or a segment of the media file. As described above in the context of text strings, the first user may submit any suitable input contributing to the translation of the media file or the segment of the media file (e.g., a text transcription of the media content, an audio/video file that translates the media content). The reliability-value of a translation may be based on a media-credibility-score of the contributing users. The media-credibility-score may be the same as the credibility-score determined from the translation of text strings. Alternatively, the media-credibility-score may be determined independent of the credibility-score determined from the translation of text strings. As an example and not by way of limitation, the media-credibility score may be based on spot-checking the translation of media items only, and not of text strings. In particular embodiments, there may be different types of media-credibility-scores for the different types of media (e.g., a video-credibility-score, an audio-credibility-score), and each of the different types may take into account the different factors that would be relevant to translating the respective type. As an example and not by way of limitation, the media-credibility-score may take into account factors that would influence a user's ability to translate the respective type of media. In this example, a user who is determined to be viewing media on a small mobile phone screen may receive a lower video-credibility score in the translation of a video file than a user who is viewing the video on a high-definition desktop monitor. The different media-credibility-scores may be calculated independent of the credibility-score determined from the translation of text strings or, alternatively, may be based on that score and altered to account for the relevant factors.

FIG. 7 illustrates an example method 700 for crowdsourcing translations on an online social network. The method may begin at step 710, where the social-networking system 160 may select a first text string from a set of text strings to be translated, wherein each text string of the set of text strings is associated with a priority value, and wherein the first text string is selected based on its priority value, wherein the priority value of the first text string is determined based on one or more previously calculated reliability-values of one or more translations for the first text string. At step 720, the social-networking system 160 may send, to a client system of a first user, instructions configured to present a translation prompt comprising the first text string and a translation-input field, wherein the first user is associated with a credibility-score based on prior translation activity of the first user. At step 730, the social-networking system 160 may receive, from the client system, an input by the first user at the translation-input field, wherein the input corresponds to a first translation for the first text string. At step 740, the social-networking system 160 may calculate, by one or more of the computing devices, a reliability-value for the first translation based on the input and the credibility-score of the first user. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for crowdsourcing translations on an online social network including the particular steps of the method of FIG. 7, this disclosure contemplates any suitable method for crowdsourcing translations on an online social network including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
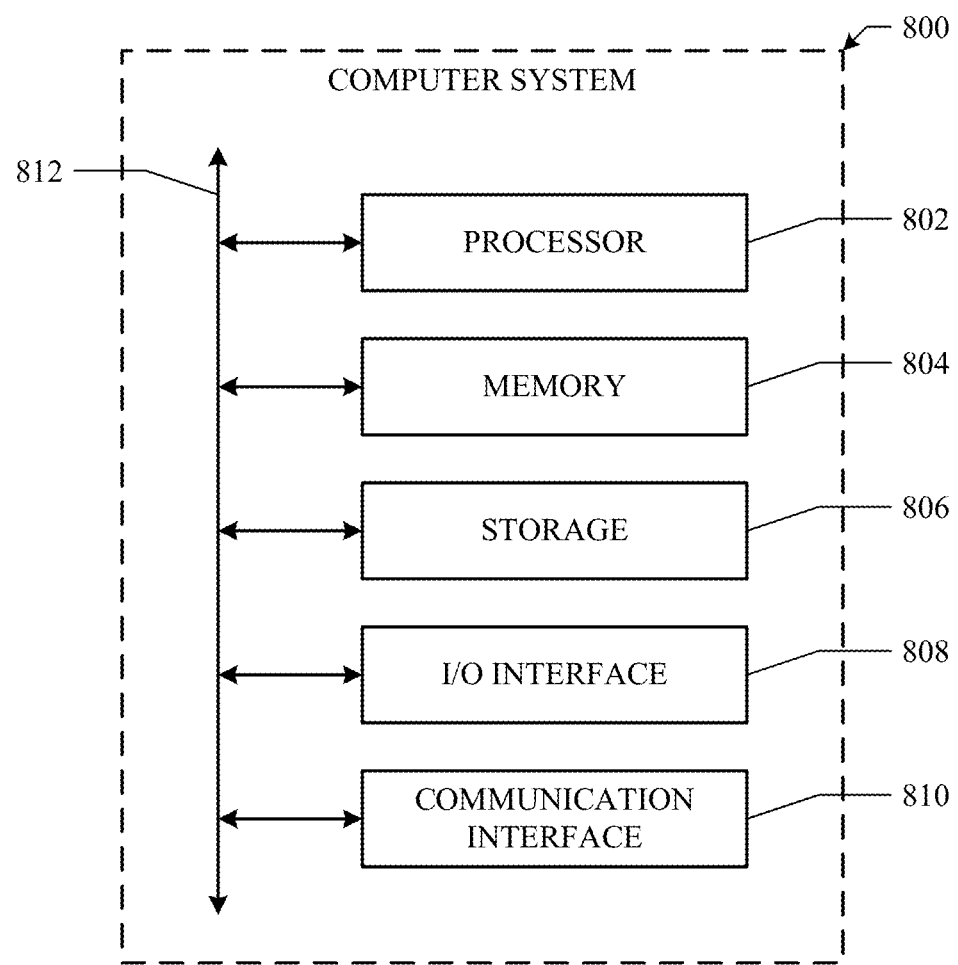
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of crowdsourcing translations, the method comprising, by one or more computing devices:
    accessing, by one or more of the computing devices, one or more translations for each text string of a plurality of text strings;
    determining, by one or more of the computing devices, a priority value for each text string of the plurality of text strings, wherein the priority value for the text string is based on one or more reliability-values of the one or more translations for the text string, wherein the one or more reliability-values comprise a best-reliability-value of a first text string, wherein the best-reliability-value is a reliability-value of a best translation for the first text string, the best translation having a reliability-value greater than the reliability-values of all other translations for the first text string;
    determining that the best-reliability-value of the first text string is within a range of reliability-values below a threshold reliability-value, wherein the threshold reliability-value is a reliability-value above which the best translation is suitable for publishing;
    in response to determining that the best-reliability-value of the first text string is within the range of reliability-values below a threshold reliability-value, increasing the priority value for the first text string;
    selecting, by one or more of the computing devices, a particular text string from the plurality of text strings based on its priority value; and
    sending, from one or more of the computing devices to a client system, instructions configured to display, on a user interface of the client system, a translation prompt comprising the particular text string.

2. The method of claim 1, wherein a reliability-value of a first translation of the one or more translations is based on a credibility-score of a first user who submitted an input associated with the first translation.

3. The method of claim 2, wherein the credibility-score of the user who submitted an input associated with the first translation is based on a number of inputs by the first user that match respective correct translations for one or more respective control strings.

4. The method of claim 3, wherein a correct translation for a control string is a translation that has a reliability-value greater than a threshold reliability-value.

5. The method of claim 2, further comprising:
    accessing a social graph of an online social network, the social graph comprising a plurality of nodes and a plurality of edges connecting the nodes, each of the edges between two of the nodes representing a single degree of separation between the two nodes, the nodes comprising:
        a first node that corresponds to the first user who submitted the input associated with the first translation;
        a plurality of second nodes that each correspond to a second user or a concept; and
    calculating a credibility-score of the first user based on social-graph information associated with the first node.

6. The method of claim 5, wherein the credibility-score of the first user is further based on social-graph information associated with one or more second nodes of the plurality of second nodes.

7. The method of claim 5, wherein the credibility-score of the first user is further based on a credibility-score of one or more second users corresponding to one or more second nodes of the plurality of second nodes.

8. The method of claim 1, wherein, for each text string of the plurality of text strings, the priority value of the text string is further based on an impact-metric of the text string, wherein the impact-metric measures an importance of the text string.

9. The method of claim 8, wherein, for each text string of the plurality of text strings, determining the priority value of the text string further comprises weighting the impact-metric of the text string by a pre-determined value.

10. The method of claim 8, wherein, for each text string of the plurality of text strings, the impact-metric of the text string is based on an estimate of a number of distinct users for whom a translation of the text string is to be published, the estimate being based on a sample of a plurality of text strings or their associated translations that have been published to a subset of users.

11. The method of claim 8, wherein, for each text string of the plurality of text strings, the impact-metric of the text string is based on an estimate of an occurrence-frequency of the text string, the occurrence-frequency being a frequency with which the text string or its associated translation is published to individual users of a subset of users.

12. The method of claim 1, further comprising increasing the priority value of the first text string in response to determining that the best-reliability-value of the first text string is lower than a minimum reliability-value.

13. The method of claim 1, further comprising increasing the priority value of the first text string in response to determining that the best-reliability-value of the first text string is higher than a pre-determined reliability-value.

14. The method of claim 1, further comprising publishing the best translation in response to determining that the best-reliability-value exceeds the threshold reliability-value.

15. The method of claim 1, wherein the translation prompt comprises a first translation-input field associated with a first translation for the particular text string and one or more second translation-input fields associated with one or more second translations for the particular text string, respectively, and wherein, in response to receiving an up-vote for the first translation:
the reliability-value of the first translation is increased by a first amount; and
one or more reliability-values of one or more of the second translations are decreased by a second amount.

16. The method of claim 15, wherein the first amount and the second amount are determined based on a credibility-score of a user who submitted the up-vote for the first translation.

17. One or more computer-readable non-transitory storage media for crowdsourcing translations, the media embodying software that is operable when executed to:
access, by one or more computing devices, one or more translations for each text string of a plurality of text strings;
determine, by one or more of the computing devices, a priority value for each text string of the plurality of text strings, wherein the priority value for the text string is based on one or more reliability-values of the one or more translations for the text string, wherein the one or more reliability-values comprise a best-reliability-value of a first text string, wherein the best-reliability-value is a reliability-value of a best translation for the first text string, the best translation having a reliability-value greater than the reliability-values of all other translations for the first text string;
determine that the best-reliability-value of the first text string is within a range of reliability-values below a threshold reliability-value, wherein the threshold reliability-value is a reliability-value above which the best translation is suitable for publishing;
in response to determining that the best-reliability-value of the first text string is within the range of reliability-values below a threshold reliability-value, increase the priority value for the first text string;
select, by one or more of the computing devices, a particular text string from the plurality of text strings based on its priority value; and
send, from one or more of the computing devices to a client system, instructions configured to display, on a user interface of the client system, a translation prompt comprising the particular text string.

18. A system for crowdsourcing translations, the system comprising: one or more processors; and a non-transitory memory coupled to the processors comprising instructions executable by the processors, the processors operable when executing the instructions to:
access, by one or more computing devices, one or more translations for each text string of a plurality of text strings;
determine, by one or more of the computing devices, a priority value for each text string of the plurality of text strings, wherein the priority value for the text string is based on one or more reliability-values of the one or more translations for the text string, wherein the one or more reliability-values comprise a best-reliability-value of a first text string, wherein the best-reliability-value is a reliability-value of a best translation for the first text string, the best translation having a reliability-value greater than the reliability-values of all other translations for the first text string;
determine that the best-reliability-value of the first text string is within a range of reliability-values below a threshold reliability-value, wherein the threshold reliability-value is a reliability-value above which the best translation is suitable for publishing;
in response to determining that the best-reliability-value of the first text string is within the range of reliability-values below a threshold reliability-value, increase the priority value for the first text string;
select, by one or more of the computing devices, a particular text string from the plurality of text strings based on its priority value; and
send, from one or more of the computing devices to a client system, instructions configured to display, on a user interface of the client system, a translation prompt comprising the particular text string.

19. The media of claim 17, wherein a reliability-value of a first translation of the one or more translations is based on a credibility-score of a first user who submitted an input associated with the first translation.

20. The media of claim 19, wherein the credibility-score of the user who submitted an input associated with the first translation is based on a number of inputs by the first user that match respective correct translations for one or more respective control strings.

21. The media of claim 20, wherein a correct translation for a control string is a translation that has a reliability-value greater than a threshold reliability-value.

22. The media of claim 19, wherein the software is further operable when executed to:
access a social graph of an online social network, the social graph comprising a plurality of nodes and a plurality of edges connecting the nodes, each of the edges between two of the nodes representing a single degree of separation between the two nodes, the nodes comprising:
a first node that corresponds to the first user who submitted the input associated with the first translation;
a plurality of second nodes that each correspond to a second user or a concept; and
calculate a credibility-score of the first user based on social-graph information associated with the first node.

23. The media of claim 22, wherein the credibility-score of the first user is further based on social-graph information associated with one or more second nodes of the plurality of second nodes.

24. The media of claim 22, wherein the credibility-score of the first user is further based on a credibility-score of one or more second users corresponding to one or more second nodes of the plurality of second nodes.

25. The media of claim 17, wherein, for each text string of the plurality of text strings, the priority value of the text string is further based on an impact-metric of the text string, wherein the impact-metric measures an importance of the text string.

26. The media of claim 25, wherein, for each text string of the plurality of text strings, determining the priority value of the text string further comprises weighting the impact-metric of the text string by a pre-determined value.

27. The media of claim 25, wherein, for each text string of the plurality of text strings, the impact-metric of the text string is based on an estimate of a number of distinct users for whom a translation of the text string is to be published, the estimate being based on a sample of a plurality of text strings or their associated translations that have been published to a subset of users.

28. The media of claim 25, wherein, for each text string of the plurality of text strings, the impact-metric of the text string is based on an estimate of an occurrence-frequency of the text string, the occurrence-frequency being a frequency with which the text string or its associated translation is published to individual users of a subset of users.

29. The media of claim 17, wherein the software is further operable when executed to increase the priority value of the first text string when the best-reliability-value of the first text string is lower than a minimum reliability-value.

30. The media of claim 17, wherein the software is further operable when executed to increase the priority value of the first text string when the best-reliability-value of the first text string is higher than a pre-determined reliability-value.

31. The media of claim 17, wherein the software is further operable when executed to publish the best translation in response to determining that the best-reliability-value exceeds the threshold reliability-value.

32. The media of claim 17, wherein the translation prompt comprises a first translation-input field associated with a first translation for the particular text string and one or more second translation-input fields associated with one or more second translations for the particular text string, respectively, and wherein, in response to receiving an up-vote for the first translation:
- the reliability-value of the first translation is increased by a first amount; and
- one or more reliability-values of one or more of the second translations are decreased by a second amount.

33. The media of claim 32, wherein the first amount and the second amount are determined based on a credibility-score of a user who submitted the up-vote for the first translation.

* * * * *